US008881686B2

(12) United States Patent
So (10) Patent No.: US 8,881,686 B2
(45) Date of Patent: Nov. 11, 2014

(54) REMOTE ANIMAL TRAINING SYSTEM USING VOLTAGE-TO-FREQUENCY CONVERSION

(75) Inventor: Hosung So, Torrance, CA (US)

(73) Assignee: E-Collar Technologies, Inc., Garrett, IN (US)

( * ) Notice: Subject to any disclaimer, the term of this patent is extended or adjusted under 35 U.S.C. 154(b) by 366 days.

(21) Appl. No.: 12/976,987

(22) Filed: Dec. 22, 2010

(65) Prior Publication Data
US 2012/0160181 A1 Jun. 28, 2012

(51) Int. Cl.
A01K 15/00 (2006.01)
A01K 15/02 (2006.01)

(52) U.S. Cl.
CPC ................................. A01K 15/021 (2013.01)
USPC .......................................... 119/720; 119/712

(58) Field of Classification Search
USPC ..................................... 119/71–720
See application file for complete search history.

(56) References Cited

U.S. PATENT DOCUMENTS

| 4,199,921 | A | * | 4/1980 | Watkins ............................ 54/71 |
| 4,802,482 | A | | 2/1989 | Gonda et al. |
| 5,054,428 | A | | 10/1991 | Farkus |
| 5,353,744 | A | | 10/1994 | Custer |
| 5,465,687 | A | | 11/1995 | Custer |
| 5,559,498 | A | | 9/1996 | Westrick et al. |
| 5,605,116 | A | * | 2/1997 | Kim et al. ....................... 119/720 |
| 5,666,908 | A | | 9/1997 | So |
| 5,857,433 | A | * | 1/1999 | Files ............................ 119/720 |
| 5,913,284 | A | | 6/1999 | Van Curen et al. |
| 6,019,066 | A | * | 2/2000 | Taylor ........................... 119/720 |
| 6,073,589 | A | | 6/2000 | Curen et al. |
| 6,131,535 | A | | 10/2000 | So |
| 6,135,060 | A | | 10/2000 | So |
| 6,170,439 | B1 | | 1/2001 | Duncan et al. |
| 6,474,269 | B2 | | 11/2002 | So |
| 6,549,133 | B2 | | 4/2003 | Duncan et al. |
| 6,598,563 | B2 | | 7/2003 | Kim et al. |
| 6,637,376 | B2 | | 10/2003 | Lee, IV |
| 6,725,810 | B2 | * | 4/2004 | Schwartz ....................... 119/720 |
| 6,860,240 | B2 | | 3/2005 | Kim et al. |
| 7,017,524 | B2 | | 3/2006 | Gillis et al. |
| 7,111,586 | B2 | | 9/2006 | Lee et al. |
| RE39,931 | E | | 12/2007 | So |
| 8,181,607 | B2 | * | 5/2012 | Kim ............................... 119/720 |
| 2007/0221138 | A1 | * | 9/2007 | Mainini et al. ................. 119/720 |

* cited by examiner

Primary Examiner — Kristen C Hayes
(74) Attorney, Agent, or Firm — Taylor IP, P.C.

(57) ABSTRACT

An animal training device and system which uses a voltage to frequency conversion technology (VFC) providing the capability to adjust in gradual incremental levels upward and downward for consistent and individual electronic control of separate output to an animal undergoing training to learn new behaviors which are desired by its owner/handler/trainer. The device is contained in a housing which is worn around the neck of an animal by means of a collar strap or attached to a harness that properly fits onto an animal. The primary use is with dogs, but all kinds of domestic animals may be trained using this device. This VFC technology is offered in a variety of electronic platforms. Whether one-way or two-way remote control with manual activation by the user, automatic activation by remote sensor detectors, or automatically activated by an on-board microprocessor circuitry sensing the animals own actions, either or all device outputs allow the animal's caretaker the unique capability to select an appropriate level of one of a variety of cue signals at a given moment allowing the animal not to be overwhelmed or to cause any over-reactions.

10 Claims, 5 Drawing Sheets

REMOTE ANIMAL TRAINING SYSTEM USING VOLTAGE-TO-FREQUENCY CONVERSION

BACKGROUND OF THE INVENTION

The field of the present invention is remote training devices for animals.

In the training of animals since the late 1960's, owners/handlers/trainers (hereinafter "user") have employed various electronic techniques and technologies to encourage and/or discourage an animal's actions. From this, an animal can learn desired behaviors. These electronic aides, whether remotely controlled by the user, manually controlled by sensor inputs or automatically controlled by the animal's own actions, have advanced throughout the years to gain prominence in today's electronic world.

Different kinds of electronic cue signals have been employed using varying degrees, or levels, of sounds, vibrations, and electrical impulses. With these tools and through experience gained through the years, focus has been on making these cue signals fit specific events while improving the animal's acceptance in learning its tasks more easily. This experience has been predominately been with dogs; although the application of such devices are not specifically limited only to dogs.

During this evolution, manufacturers offered users the capability to select different levels of cue signals at a given moment from a hand-held transmitter to the dog's collar at a distance and from one to over one hundred different levels. From this vantage, what has been learned is that one level is not always the appropriate level. Rather, many levels are useful and depend upon the temperament and distraction level of each individual dog at any given moment. It is advantageous to have the means to quickly adjust the level to match the dog's current focus. Yet, even a selector dial with many levels to select from may not be enough as the available levels may not properly match the dog's adrenal releases and distractions.

Therefore a device was needed which provides incremental gradual levels that can be quickly adjusted just as the volume control in ones car radio—fitting the individual's hearing quality while overcoming background noise levels. In this manner, the device's output needs to finitely change to match the dog's adrenaline and background distractions at any given moment and at appropriate distances. Not only to go up in level but to instantly come down in level, therein never overwhelming the dog or causing any over reactions by the dog.

SUMMARY OF THE INVENTION

The present invention is directed to a remote control for animal training including a remote controller held by a user and a training device worn by an animal coupled by radio frequency (RF) communication. The remote controller has a stimulation mode selection button, a control for setting the level of electrical impulse stimulation to be applied to the animal which includes a three-terminal potentiometer for volume control. A voltage-to-frequency converter converts a voltage level set by the volume control to a corresponding frequency signal proportional to the voltage level. RF communication circuitry transmits signals including the kind and mode of stimuli and the level of electrical impulse stimulation to the training device through a transmitting antenna.

Additional features are selectively contemplated including a buzzer and an LED on the training device controlled by the remote controller. Battery charge status of the power sources on the two devices are contemplated for the remote controller. A GPS locator and a detachable antenna are also contemplated.

Therefore, it is an object of the present invention to provide an improved animal training device. Other and further objects and advantages will become apparent from the following description.

DETAILED DESCRIPTION OF THE PREFERRED EMBODIMENTS

A remote control for animal training includes a user hand-held transmitter for transmitting coded command signals. The command signals are transmitted via a microprocessor amplified through a RF system and outputted through an antenna. The remote control further includes a training device worn by the animal to be trained. An RF receiver receives command signals with individual output levels of three different styles of stimuli to the sensory system of the animal in order to allow the animal to properly react or respond to these levels of stimuli.

A hand-held transmitter uses a voltage frequency converter (VFC) for converting input from a three-terminal potentiometer voltage to a frequency proportional thereto. The frequency signal is input to a microprocessor. The microprocessor has a security code function to limit control of the training device to that of the remote controller. Five function switches allow for the selection of one of five types of stimulation, 1) brief electrical impulse stimulation, 2) continuous electrical impulse stimulation, 3) boost continuous electrical impulse stimulation, at a preset level above the continuous stimulation setting, 4) magnetic buzzer stimulation, and 5) light stimulation. The switches are connected to the RF circuitry to produce and amplify signals denoting the selected stimulation then delivered to an antenna driver and in turn to a tuned broadcast antenna.

An animal collar receiver receives the RF transmitted coded signals from the transmitter. A detector circuit detects the coded signals and sends them to an on-board microprocessor. The microprocessor converts the coded signals and activates one of five driver circuits for then outputting the selected stimuli and the appropriate level to the animal. The same RF circuitry on both the remote controller and the training device can function as paired transceivers to broadcast intelligent data back to the hand-held transmitter.

A stimulator adjustment control includes a voltage divider network with a three-terminal potentiometer. The potentiometer is coupled to a voltage to frequency converter circuit (VFC) which converts the voltage level into individual separate frequencies. These separate frequencies allow the microprocessor to send the appropriate signal to the individual stimuli drivers for the five different outputs at the animal collar to articulate many different gradual levels of output from each of the five individually selectable stimuli.

Both the transmitter and receiver employee a DC battery pack for operating each system through an on-board regulator and power switch. In one embodiment, rechargeable batteries and their charging circuits are installed.

On/off power switches are provided in each the transmitter and the receiver to activate and deactivate each system independently. In one embodiment, an LCD screen is employed in the transmitter and offers the user the capability to observe in a visual display the level setting, the state of the transmitter battery and which one of the five select function buttons is powered up when that particular button is pressed, preferably by icon.

With the capability to adjust gradual levels upward and downward while also providing different styles of stimulation, the control offers the animal opportunities to be successful while allowing the user to build a more meaningful relationship with the animal. To allow greater potential for successful training results, these sensory detectors and their drive circuitry would include utilizing optical, photo, infrared, air flow, vibration, tilt, pressure, reflective, magnetic, temperature, voltage, current, frequency, and percussion transducer/sensors of all sorts and kinds.

Such electronic control activations would include utilizing the following signal types as cues:

Sound—audible, ultrasonic, and subsonic created by mechanical speaker/microphone, relay buzzer, solid-state, piezoelectric, ceramic, ferrite, magnetic, condenser, and percussion (utilizing all frequencies, pulse rates, duty cycles, pulse widths, amplitudes, duration, repetition rates and such.)

Light—all spectrum colors, brilliances, and such (utilizing all frequencies, pulse rates, duty cycles, pulse widths, amplitudes, duration, repetition rates and such.)

Taste—sweet to poison.

Smell—pungent to flowery.

Electrical impulse—Transformer control of low current (50 micro-amps to 100 milliamps) with high-voltage (50 VAC to 10,000 VAC) (utilizing all frequencies, pulse rates, duty cycles, pulse widths, amplitudes, duration, repetition rates and such.)

Vibration—motor-drive, mechanical offset fulcrum, pancake, ceramic, percussion and transducer (utilizing all frequencies, pulse rates, duty cycles, pulse widths, amplitudes, duration, repetition rates and such.)

Figure 2:
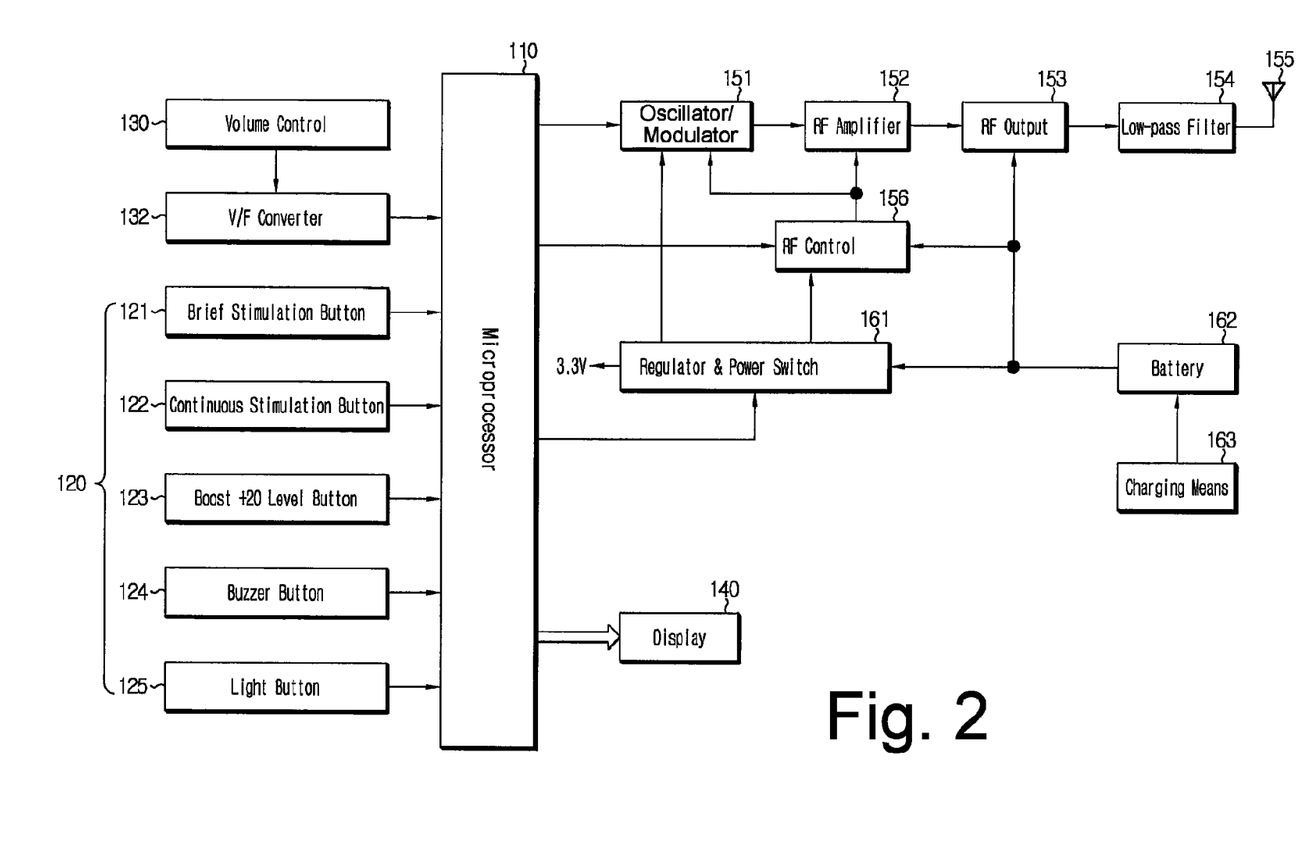
FIG. 2 is a block diagram showing the remote controller circuitry according to a first embodiment.
Figure 4:
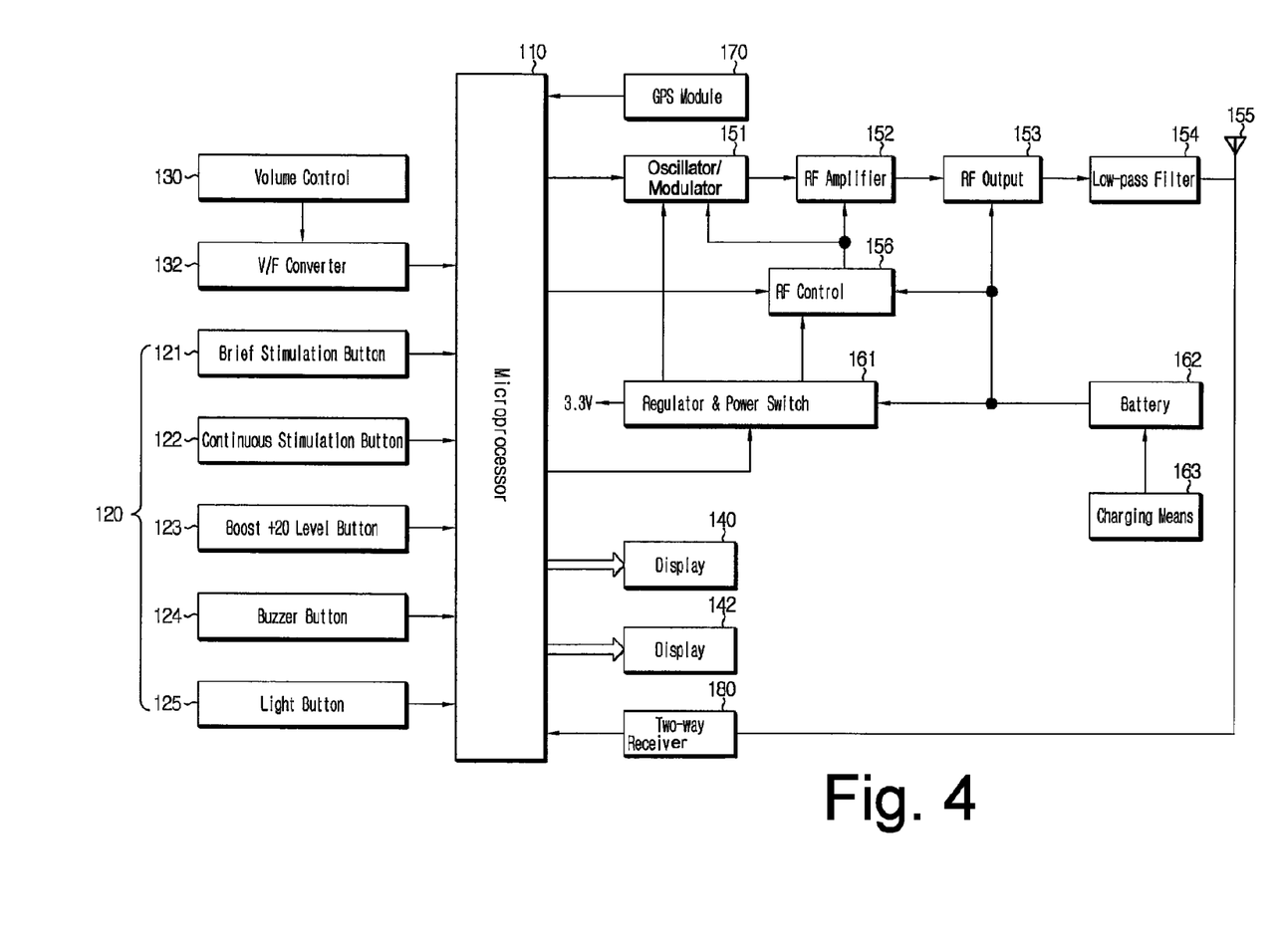
FIG. 4 is a block diagram showing the remote controller circuitry according to a second embodiment.

Looking more specifically to the figures, FIGS. 2 and 4 depict a hand-held remote controller 100. If any one of first to fifth function buttons (switches) of the remote controller is pressed, corresponding data and ID codes set by an ID code setting means are provided to an oscillator/modulator 151. Then, RF signals generated in the oscillator/modulator 151 are amplified at an RF amplifier 152 and an RF output terminal 153, filtered at a low-pass filter 154 to remove harmonics, and then emitted through an antenna 155 as radio waves.

A stimulation adjustment control 130 uses a potentiometer as a "volume" (magnitude) control which allows precise control or gradual change of the stimulation level suitably for an animal, differently from the prior art. A conventional stimulation adjustment means uses a mechanical selector switch, and such a selector switch cannot subdivide a stimulation level precisely.

Figure 3:
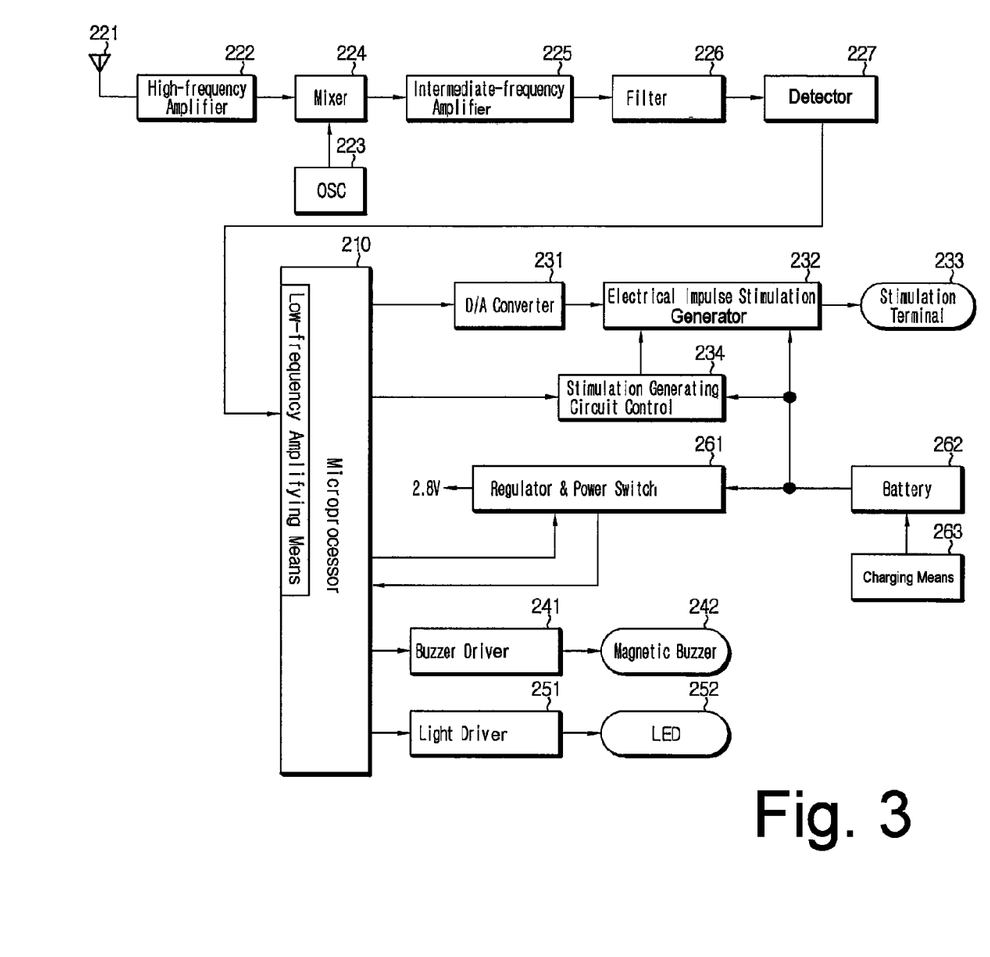
FIG. 3 is a block diagram showing the training device according to the first embodiment.
Figure 5:
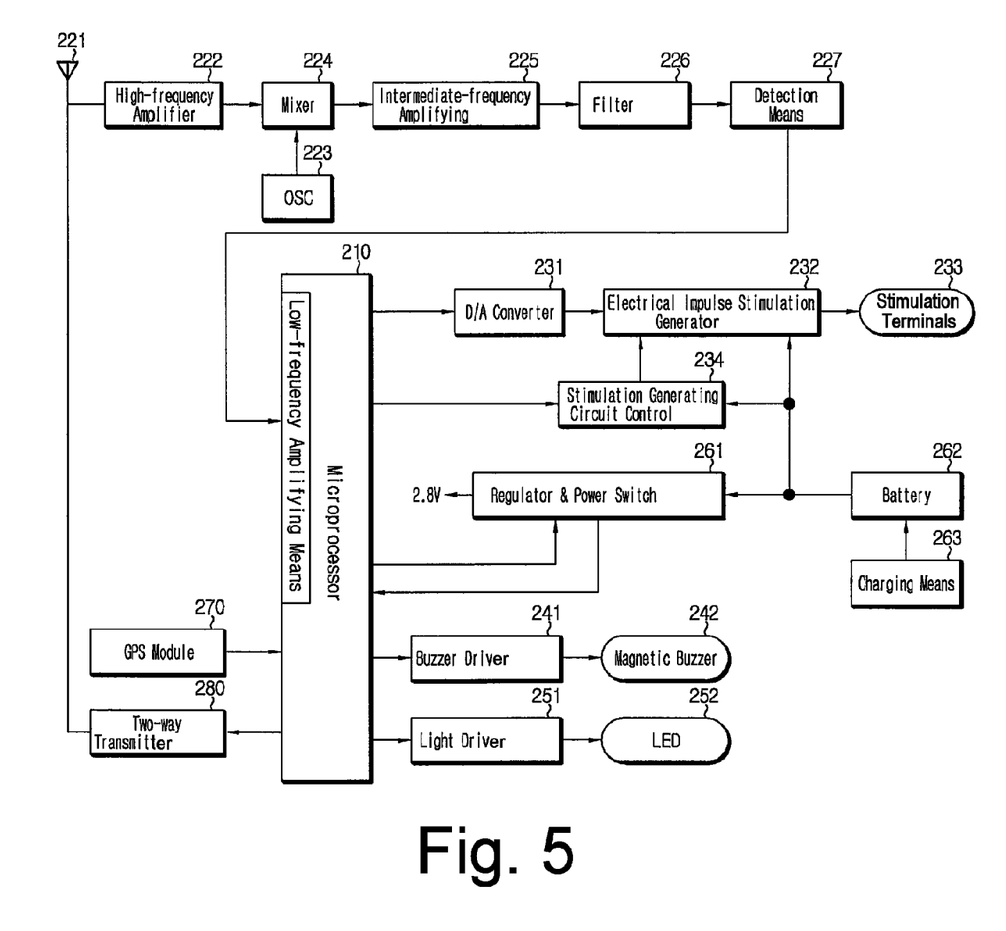
FIG. 5 is a block diagram showing the training device according to the second embodiment.

FIGS. 3 and 5 depict a training device 200. The training device 200 receives the RF signals emitted in the transmission of the remote controller 100 of FIGS. 2 and 4 respectively through an antenna 221 included therein. Then, a high-frequency amplifier 222 amplifies weak radio waves, and a mixer 224 makes a secondary intermediate frequency such that a detector 227 extracts the data sent from the transmitter via a filter 226. The extracted data is input to a low-frequency amplifier included in a microprocessor 210. The microprocessor 210 outputs a signal to a selected one of a electrical impulse stimulation generator if the ID code contained in itself is identical to the ID code sent from the transmitter.

REFERENCE SYMBOLS

FIGS. 2 and 4

Remote Controller 100

120: Buttons (or, switches)

121: Brief Stimulation Button

Brief low-frequency electrical impulse stimulation (3 to 5 pulses) is generated at the training device regardless of the time during which the button of the remote controller is pressed.

122: Continuous Stimulation Button

Continuous low-frequency electrical impulse stimulation is generated at the training device during the time that the button of the remote controller is pressed (12 seconds at the maximum).

123: +20 Level Boost Continuous Stimulation Button

Boost low-frequency electrical impulse stimulation is preset at 20 levels higher than the continuous impulse level and is generated at the training device during the time that the button of the remote controller is pressed (5 to 7 seconds at the maximum).

124: Buzzer Button

A brief buzz sound is generated at the training device (3 to 5 pulses) regardless of the time during which the button of the remote controller is pressed.

125: Light Button

An LED light at the training device is turned on at the first press and turned off at the second press regardless of the time between when the button of the remote controller is pressed.

130: Volume Control

The volume control is used for adjusting the stimulation level of the training device. A low-frequency electrical impulse stimulation corresponding to the level set by the volume control is generated at the training device by means of the first, second and third function buttons.

132: V/F Converter

An analog voltage according to the level output from the volume control 130 is converted into frequency, which is a digital value recognizable by a microprocessor in the remote controller, and then transmitted to the microprocessor in the training device. For example, 20 Hz signal is provided to the microprocessor in case a volume output voltage is 0.1V (i.e. level 1), and 100 Hz signal is provided to the microprocessor in case a volume output voltage is 0.5V (i.e. level 5).

110: Microprocessor

The microprocessor controls all functions input from the function buttons 120 and outputs an ID code signal. The microprocessor also has a power ON/OFF function.

The microprocessor recognizes and processes the frequency signal supplied according to a stimulation level operates a display 140 and operates a RF control 156, which controls an RF oscillator 151 and an RF amplifier 152 when a function is operated. In the two-way system (in the second embodiment), the microprocessor processes the data received from the training device 200. For instance, the microprocessor computes a distance between a user and an animal based on position data of the user and the animal.

140, 142: Display

The level set by the volume control 130, and a residual battery capacity of the remote controller is displayed. In the two-way system (in the second embodiment), a residual battery capacity of the training device, a direction and distance of an animal from the user, a moving speed of the animal, and so on are displayed on the display 142.

151: Oscillator//Modulator

The remote controller uses FM (Frequency Modulation), and a modulation-allowable VOXO is applied to give RF oscillation and modulation at the same time.

152: RF Amplifier

RF output from the oscillator and modulator 151 is low, so the RF amplifier amplifies the output RF such that a following output terminal can be operated.

153: RF Output

The RF output is for amplifying RF such that the remote controller and the training device are within a reachable distance.

154: Low-pass Filter

The low-pass filter blocks high frequencies in the RF signal other than fundamental waves.

155: Antenna

The antenna transmits RF composed of fundamental waves, which has passed through the low-pass filter 154. In the two-way system (in the second embodiment), the antenna receives RF signal transmitted from the training device.

156: RF Control

When any one of the first to fifth button 121~125 of the remote controller is pressed, the RF control supplies power to the oscillator/modulator 151 and the RF amplifier 152 such that the oscillator/modulator 151 and the RF amplifier 152 are operated.

161: Regulator & Power Switch

The regulator & power switch has a constant-voltage IC function that is operated in association with the microprocessor 110. If the power switch of the remote controller is pressed over 0.5 second, the power is turned on. If the power switch is pressed for over 1 second again after the power is turned on, the power is turned off.

162: Battery

A rechargeable battery, is adopted.

163: Charging Device

The battery 162 is a rechargeable battery and thus the charging device is used.

170: GPS Module (in the second embodiment)

The GPS module 170 receives signals from the GPS of the training device 200 to provide the microprocessor 110 with position data of the trainer.

180: Two-way Receiver (in the second embodiment)

The two-way receiver 180 is used for receiving the information of the training device, and the two-way receiver 180 gives data to the microprocessor 110.

REFERENCE SYMBOLS

FIGS. 3 and 5

Training Device 200

221: Antenna

Figure 1:
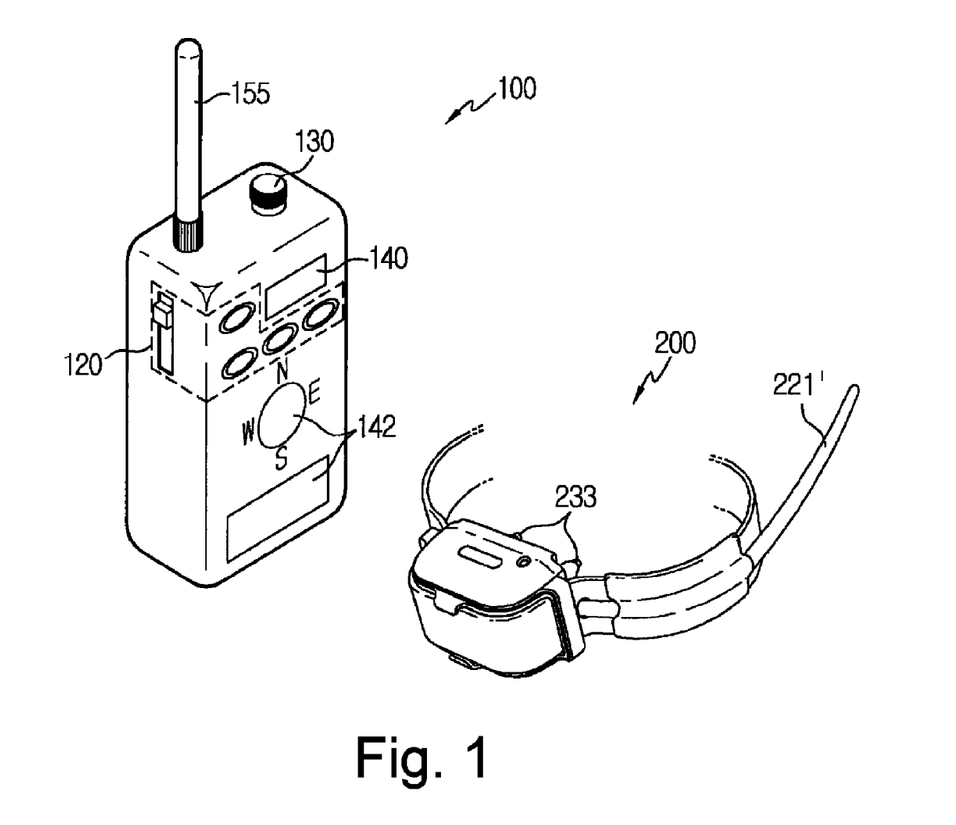
FIG. 1 is a perspective view showing a remote controller and a training device used in a remote animal training system.

The antenna receives RF signal transmitted from the remote controller 100. In the two-way system (in the second embodiment), the antenna transmits RF signal to the remote controller 100. It is preferable that the antenna 221 is an internal (built-in) antenna and a detachable external antenna 221' (see FIG. 1) is further provided to extend a reachable distance.

222: High-frequency Amplifier

The high-frequency amplifier amplifies weak RF signals induced to the receiving antenna 221.

223: OSC

OSC is an oscillator that oscillates in itself to give a secondary intermediate frequency.

224: Mixer

RF signal supplied from the high-frequency amplifier 222 is mixed with the signal supplied from the OSC 223 to make an intermediate frequency that is a secondary frequency.

225: Intermediate-frequency Amplifier

The intermediate-frequency amplifier amplifies the intermediate frequencies made at the mixer 224.

226: Filter

The filter filters the intermediate frequencies made at the mixer 224 to remove noise.

227: Detector

The detector detects function signals and ID signals sent from the remote controller.

210: Microprocessor

A low-frequency amplifier included in the microprocessor amplifies analog signals detected by the detector 227; and, in case the received signal is identical to ID code already stored, a signal of any one selected from the first to fifth button 121~125 of the remote controller is output. In the two-way system (in the second embodiment), the microprocessor processes the information of the training device and gives the information to a two-way transmitter 280.

231: D/A Converter

The D/A converter is used for outputting a stimulation level, set by the volume control of the remote controller, as analog signals.

232: Electrical Impulse Stimulation Generator

The electrical impulse stimulation generator generates high-voltage stimulations to give low-frequency electrical impulse stimulations to an animal utilizing a transformer output.

233: Stimulation Terminals

The stimulation terminals are electrodes for supplying electrical impulse stimulation to an animal.

234: Stimulation Generating Circuit Control

When the first, second and third function button 121~123 of the remote controller are pressed, the stimulation generating circuit control 234 supplies power to the electrical impulse stimulation generator 232 to operate the electrical impulse stimulation generator 232.

241: Buzzer Driver
The buzzer driver is used for operating a magnetic buzzer when the fourth function button 124 of the remote controller is pressed.
242: Magnetic Buzzer
The magnetic buzzer 242 is used for converting electric signals into sound signals.
251: Light Driver
The light driver 251 is used for operating at least one LED light when the fifth function button 125 of the remote controller is pressed.
252: LED
Two high-brightness LED's 252 are applied to convert electric signals into light signals.
261: Regulator & Power Switch
The regulator & power switch 261 has a constant-voltage IC function that is operated in association with the microprocessor 210. If the magnet is contacted with the lead switch of the training device over 0.5 second, the power is turned on. If the magnet is contacted over 0.5 second again after the power is turned on, the power is turned off.
262: Battery
A rechargeable battery, is adopted.
263: Charging Means
The battery 262 is a rechargeable battery and thus the charging means 263 is used.
270: GPS (in the second embodiment)
The GPS (Global Positioning System) 270 obtains reference signals from at least three satellites to provide the microprocessor 210 with position data of the animal.
280: Two-way Transmitter (in the second embodiment)
The two-way transmitter 280 is used for transmitting the information of the training device, and the two-way transmitting 280 emits data as radio waves.

Thus, an improved animal training device has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A remote control system for animal training including a remote controller configured for use by a user and a training device worn by an animal to be trained, the remote controller and the training device configured to communicate with each other by radio frequency (RF) communication, the remote controller comprising:
    a stimulation mode selection button configured for selecting a kind and mode of stimuli to be applied to the animal, the stimuli including at least an electrical impulse stimulation;
    a volume control configured to set the level of electrical impulse stimulation to be applied to the animal, the volume control including a three-terminal potentiometer;
    a voltage-to-frequency converter configured to convert a voltage level set by the volume control to a corresponding frequency signal proportional to the voltage level;
    a RF communication circuitry configured to transmit signals including the kind and mode of stimuli and the level of electrical impulse stimulation to the training device through a transmitting antenna; and
    a microprocessor configured to receive and process inputs from the stimulation mode selection button and the voltage-to-frequency converter to produce the signals to be transmitted by the RF communication circuitry and control the RF communication circuitry.

2. The remote control system of claim 1, the training device comprising:
    a RF communication circuitry configured to receive the signals transmitted from the remote controller, the RF communication circuitry including a receiving antenna;
    an electrical impulse stimulation generator configured to generate an electrical impulse stimulation to be applied to the animal through stimulation terminals with a level set by the control of the remote controller; and
    a microprocessor configured to process the signals and control the electrical impulse stimulation generator.

3. The remote control system of claim 2,
    the training device further comprising a buzzer for applying a sound stimulation to the animal and a buzzer driver for driving the buzzer; and
    the remote controller further comprising a buzzer selection button for selecting the sound stimulation.

4. The remote control system of claim 2,
    the training device further comprising an LED and a light driver for lighting the LED; and
    the remote controller further comprising a light selection button for selecting the LED lighting.

5. The remote control system of claim 2, the receiving antenna including a built-in antenna and a detachable external antenna configured to be connected to the built-in antenna.

6. The remote control system of claim 2,
    the training device further comprising a transmitter for transmitting information of the training device including a residual battery capacity of the training device to the remote controller; and
    the remote controller further comprising a receiver for receiving the information of the training device transmitted by the transmitter and a display for displaying the residual battery capacity of the battery of the training device.

7. The remote control system of claim 2,
    the training device further comprising a GPS for obtaining position data of the animal, and a transmitter for transmitting information of the position data of the animal;
    the remote controller further comprising a module configured to receive position data of the user, a receiver configured to receive the information of the position data of the animal transmitted by the transmitter and a display for displaying the information; and
    wherein the microprocessor of the remote controller is configured to calculate a position information of the animal relative to the user based on the position data of the animal and the user, and the display displays the position information of the animal.

8. The remote control system of claim 1, the remote controller further comprising a display for displaying the level of electrical impulse stimulation set by the volume control.

9. The remote control system of claim 8, the display further displaying a residual battery capacity of the remote controller.

10. The remote control system of claim 1, the stimulation mode selection button being configured to select at least one mode of brief electrical impulse stimulation mode in which the electrical stimulation is applied to the animal for a first predetermined time period, continuous electrical impulse stimulation mode in which the electrical stimulation is applied to the animal for a second predetermined time period longer than the first predetermined time period, and boost electrical impulse stimulation mode in which the level of the electrical impulse stimulation increases by a predetermined level.

* * * * *

UNITED STATES PATENT AND TRADEMARK OFFICE
CERTIFICATE OF CORRECTION

PATENT NO. : 8,881,686 B2  Page 1 of 1
APPLICATION NO. : 12/976987
DATED : November 11, 2014
INVENTOR(S) : Hosung So It is certified that error appears in the above-identified patent and that said Letters Patent is hereby corrected as shown below:

Specification

COLUMN 5
    At line 21, please delete "VOXO", and substitute therefore --VCXO--.

Signed and Sealed this
Fifth Day of January, 2016

Michelle K. Lee
*Director of the United States Patent and Trademark Office*